United States Patent
Price

[15] 3,664,907
[45] May 23, 1972

[54] INDUSTRIAL CONVEYOR BELTS
[72] Inventor: Kenneth R. Price, Albany, N.Y.
[73] Assignee: Huyck Corporation, Rensselaer, N.Y.
[22] Filed: Feb. 2, 1970
[21] Appl. No.: 7,661

[52] U.S. Cl.............................161/89, 156/298, 156/304, 161/60, 161/93, 161/96, 161/118, 161/143, 161/170, 161/185
[51] Int. Cl...................B32b 3/06, B32b 3/10, B32b 27/38
[58] Field of Search................161/60, 98, 93, 96, 86, 143, 161/145, 147, 149, 170, 185, 118, DIG. 4, 89; 156/298, 304, 278

[56] References Cited

UNITED STATES PATENTS

| | | | |
|---|---|---|---|
| 3,226,275 | 12/1965 | Kiess | 161/89 X |
| 3,581,698 | 6/1971 | Bete | 161/185 X |
| 3,597,300 | 8/1971 | Miller | 161/86 X |
| 3,607,599 | 9/1971 | McPherson | 161/144 |
| 3,616,112 | 10/1971 | Desai | 161/89 X |
| 3,617,613 | 11/1971 | Benzinger | 161/98 X |
| 3,619,314 | 11/1971 | Ecureux | 161/145 X |
| 3,391,050 | 7/1968 | Nebesar | 161/60 X |
| 3,567,568 | 3/1971 | Windecker | 161/93 |
| 3,573,150 | 3/1971 | Broutman et al. | 161/60 |
| 3,393,117 | 7/1968 | Zolg et al. | 161/93 X |
| 3,544,421 | 12/1970 | Griffith | 161/60 X |
| 3,186,866 | 6/1965 | Claeys | 161/93 X |
| 3,400,038 | 9/1968 | Burgess | 161/86 X |
| 3,441,465 | 4/1969 | Pearson | 161/86 X |
| 3,515,623 | 6/1970 | Bates | 161/86 |
| 3,526,565 | 9/1970 | Walter | 161/86 X |

*Primary Examiner*—Harold Ansher
*Attorney*—William G. Rhines

[57] ABSTRACT

This invention relates to bonds, and processes for making same, which are useful in the manufacture, joining, and repair of industrial conveyor belts, and endless cloth used in paper manufacturing machinery, and, more particularly, to a structurally integrated, yet pervious, laminated structure comprising a first layer intermediate and continuously bonded to second and third layers. The resultant porous laminate manufactured in accordance with the teachings of the present invention may be used in various applications related to industrial conveyor belts or papermakers clothing. For example, it may be employed to form a seam for or a patch in papermakers fabrics useful in the forming section of the typical fourdrinier papermaking machine.

14 Claims, 7 Drawing Figures

Patented May 23, 1972

INVENTOR.
KENNETH R. PRICE
BY
ATTORNEY-

Patented May 23, 1972

INVENTOR.
KENNETH R. PRICE
BY William S. Klems

ATTORNEY

INDUSTRIAL CONVEYOR BELTS

BACKGROUND OF THE INVENTION

Paper machine forming media conventionally have been woven wire structures made from materials such as phosphor bronze, bronze, stainless steel, brass or suitable combinations thereof. Such forming "wires" are woven flat in plain, twill, satin, or other suitable weave patterns. Subsequent to the weaving of the "wire," the ends are joined to form an endless belt-like structure, as by brazing the abutting ends of constituent machine direction wires together. Recently fabrics of superior suitability for use as forming media have been woven entirely or in part from synthetic materials. Nylon, a polyamide fiber, has been found to be suitable, as have polyesters, such as Dacron, acrylic fibers such as Orlon, Dynel and Acrilan, and co-polymers such as Saran. The warp and weft yarns may be of the same or different constituent materials and/or constructions and may be in the form of monofilament or multifilament yarns, or they may be yarns made up of suitable strands or plies which in turn may be formed from staple fiber. Such fabrics may be woven endless, as, for example, the fabric described and claimed in U.S. Pat. No. 2,903,021, Holden et al. However, since, in the endless woven papermakers fabrics the filling or weft yarns extend in the machine direction when the fabric is positioned on the paper-making machine, the width of looms used to produce a forming fabric which has been woven endless must be at least as great as the length of the forming section of the papermaking machine which the fabric is to clothe. Alternatively, such fabrics may be woven flat and made endless by joining the two ends of the fabric together. Such a process, which usually involves handweaving, is time-consuming and expensive. Attempts have been made to join synthetic forming media using those techniques used to join both ends of forming "wires." However, when, for example, synthetic monofilament yarns are "welded" together, the "welds" are not as strong as the constituent yarns which comprise the remaining portion of the fabric, and the "weld" therefore may not be strong enough to withstand the rigors to which the fabric is subjected during the papermaking operation where the forming fabric may be subjected to machine direction tensions as high as about 45 pounds per lineal inch of width. The design of a seam suitable for use on forming fabrics has been further impeded because of physical characteristics other than strengths which are required for such fabrics. For example, forming media, including the seam portions must be (1) capable of passing large amounts of water from the furnish, and yet retaining most of the deposited fibers, (2) flexible, (3) smooth and uniform in order to prevent marking or undue marring of the paper surface, (4) dimensionally stable in order to prevent yarn "shoving" and dimensional changes, which can vary the permeability of the medium and therefor its drainage and other characteristics, as well as the characteristics of the paper formed thereon from place to place, and (5) resistant to wear and corrosion in the aqueous environment of the forming section.

In accordance with the teachings set forth herein, a fabric seam, and method of producing same, is disclosed which has the physical characteristics, as set forth above, required of, for example, a forming fabric, and which is inexpensive and not time-consuming to make.

The resultant porous laminate disclosed herein may also be used in the repair of industrial conveyor belts or papermakers clothing. For example, a common occurrence in the papermaking process is for the forming fabric to become ripped or to develop a tear in the body of the fabric. In such cases, if the tear or rip is not repaired, there will be a tendency for the damaged area of the fabric to mark the paper or paper-like product being produced. Heretofore, attempts have been made to repair such damaged areas by adhesively bonding a fabric-like patch to the fabric in such a manner that the patch covers the torn area. With the advent of synthetic monofilament fabrics, however, there has been a tendency for the fabric to fail in the patch area and for the patch to be torn from the fabric as a result of the stresses to which the fabric and patch are subjected. As explained in greater detail hereinafter, such failure is due at least in part to the low peel strength of the patch-adhesive-fabric laminates heretofore used. In addition to solving the problem of designing a fabric patch which will adhere to, for example, a monofilament forming fabric for the life of the fabric in question, the present invention is directed to a patching process, and product produced thereby, by which the physical characteristics of the patched area of the fabric do not substantially differ from the physical characteristics of the fabric as a whole, as set forth above; that is, the patched area will be (1) fluid permeable, (2) flexible, (3) smooth and uniform, (4) dimensionally stable, and (5) resistant to wear and corrosion. For example, if the permeability or porosity of a forming fabric at the patched area substantially differs from the permeability or porosity of the remaining portion of the fabric, there may be a tendency for the paper or paper-like product being produced to become marred or marked as a result of the difference. In addition, marring or marking will occur if the thickness of the patched area is substantially greater than the thickness of the remaining portion of the fabric. By producing a patch-scrimfabric laminate in accordance with the teachings of the present invention, the life of the fabric is prolonged without substantially reducing the quality of the product being produced. In addition, as a result of the ease with which the patch can be applied to the fabric, as taught herein, papermaking machine shutdown time is minimized.

In a further application, the porous laminate described herein may also be used in the manufacture of duplex or multilayered industrial conveyor belts or papermakers clothing. For example, it may be employed to form a duplex forming fabric. Such fabrics are useful, for example, in the production of high quality paper. In such cases, it is often desirable to utilize a forming fabric comprising a coarse base fabric adhered to a fine surface or paper-containing fabric. Heretofore, such fabrics have comprised two woven layers woven or stitched together. Since the manufacture of such structures requires extensive loom alterations, loom shutdown is necessarily prolonged. The present invention eliminates such extensive loom shutdown.

It should be noted that the porous laminate disclosed herein is useful in other applications involving seaming, patching, and multilayered fabrics; that is, the present invention is not limited to the seaming and patching of forming fabrics, or to the manufacture of duplex or multilayered forming fabrics. Rather, the teachings of the present invention are applicable to other types of industrial conveyor belts, and other types of papermakers clothing, such as press and dryer fabrics, as described and claimed in U.S. Pat. Nos. 3,214,331, Wicker, and 3,192,599, Wagner, respectively, and supplementary papermakers clothing, such as power fabrics, as described and claimed in U.S. Pat. No. 3,222,246, Lee.

The present invention is particularly applicable in those cases where the layers which it is desired to bond together are woven from yarns which are relatively inert chemically, and, due to their low free surface energies, difficult to "wet"; that is, substantially encapsulate or cover with adhesive. Because of these physical characteristics, such yarns are difficult to adhesively bond together. Yarns which have these properties include, but are not limited to, polyesters such as Dacron, and polyamides such as Nylon. Such properties are exhibited, for example, by Dacron yarns, because of the high level of orientation and crystallinity introduced into the yarn during the manufacture thereof. Although bonding techniques having limited success have been developed in such cases where multifilament yarns are used, this resulting from the mechanical interlocking of the constituent fibers of yarns in adjacent layers, since monofilament yarns have smooth, non-porous surfaces, no opportunity is offered for such mechanical interlocking. Those methods available for modifying such smooth surfaces are complex, lengthy and often include the use of highly reactive and toxic chemicals, such as isocyanates, silanes and chromic acid. Accordingly, any laminate as described herein wherein the constituent yarns comprise monofilament polyester should be one that minimizes dependence on the interface for bond strength.

Accordingly, it is an object of this invention to produce a porous laminated seam for industrial conveyor belts, or papermaking clothing, which will withstand the vigorous treatment said belts or clothing are subjected to while in operation.

Another object of this invention is to produce a porous laminated seam for papermaking clothing which is capable of passing large amounts of water from the furnish, and yet retaining most of the deposited fibers.

Still another object of this invention is to produce a porous laminated seam for papermaking clothing which is flexible.

A further object of this invention is to produce a porous laminated seam for papermaking clothing which is smooth and uniform in order to prevent marking or undue marring of the paper surface.

Still a further object of this invention is to produce a porous laminated seam for papermaking clothing which is dimensionally stable in order to prevent yarn "shoving" and dimensional changes, which can vary the permeability of the medium and therefor its drainage and other characteristics, as well as the characteristics of the paper formed thereon from place to place.

Another object of this invention is to produce a porous laminated seam for papermaking clothing which is resistant to wear and corrosion in the aqueous environment of the forming section.

Yet another object of this invention is to produce a porous laminated seam for papermaking clothing and industrial conveyor belts which is inexpensive and not time-consuming in perfecting.

Still another object of the present invention is to produce a fabric patch which achieves all of the objects set forth above.

A further object of the present invention is to produce a duplex fabric which achieves all the objects set forth above.

SUMMARY OF THE INVENTION

This invention achieves these and other objects by means of a porous laminate comprising a separate first layer interposed between a second and third layer, said layers bonded together such that the constituent yarns of said layers are continuously encapsulated in the bonding means.

DESCRIPTION OF DRAWINGS

This invention may be clearly understood by reference to the attached drawings in which.

DESCRIPTION OF PREFERRED EMBODIMENT

Figure 1:
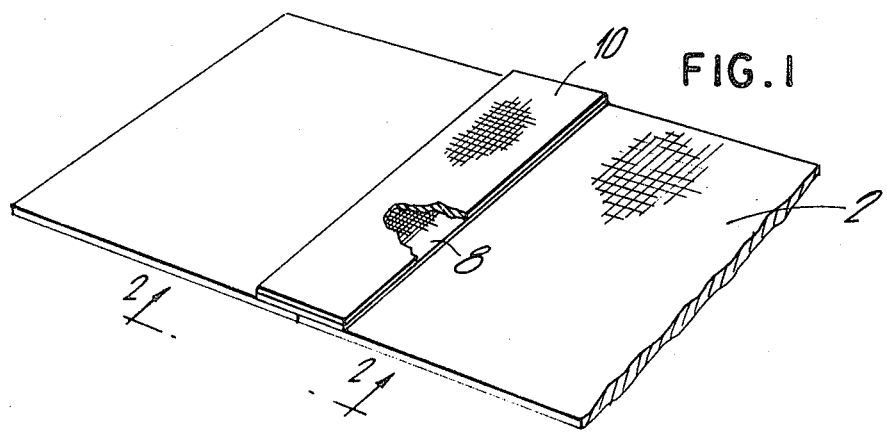
FIG. 1 is a diagrammatic view of a fabric embodying the teachings of the present invention.
Figure 2:
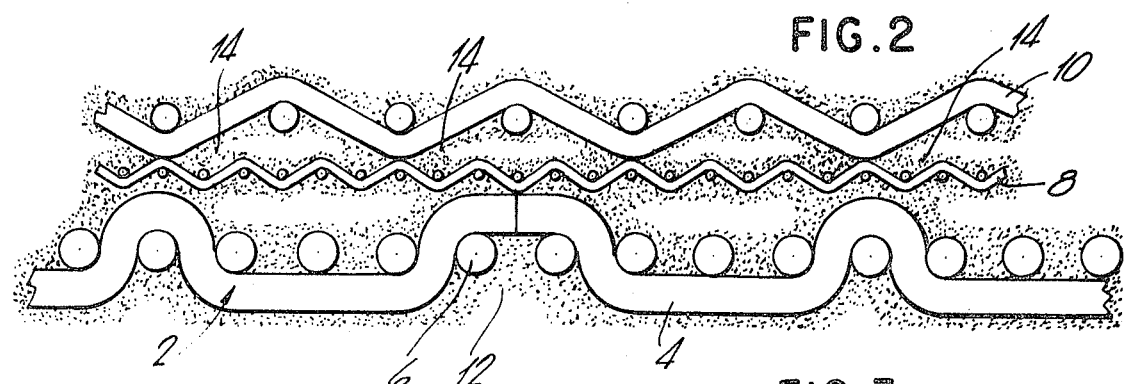
FIG. 2 is a schematic cross-section view along the line 2—2 in FIG. 1.

The embodiment of this invention, which is illustrated in FIGS. 1 and 2, is one which is particularly suited for achieving the objects of this invention. FIGS. 1 and 2 depict a portion of a single layered fourdrinier forming fabric 2 rendered endless by joining both ends thereof by interposing a separate foraminous scrim material 8 between fabric 2 and an outer fabric layer or seam material 10, and substantially continuously encapsulating the constituent members of said fabric layers and scrim material with a composition, such as, for example, a bonding agent or adhesive, substantially continuously throughout at least a portion of the region where they are superimposed with respect to each other. In this manner a fluid permeable yet structurally integrated body is produced. Forming fabric 2 comprises warp yarns 4 which extend in the machine direction and filling or weft yarns 6 which extend in the cross-machine direction, said yarns being woven into a four-harness satin weave. While FIG. 2 depicts a four-harness satin weave, other types of weaves, for example, twill weaves, may be utilized. Desirably, these yarns are synthetic monofilaments, such as, for example, polyester and polyamides. It should be noted, however, that any yarn, wire, or strand-like material, herein referred to as "yarn," having the requisite physical characteristics for use as a constituent of a forming medium, may be used.

Preferably, outer layer or seam material 10 comprises synthetic multifilament yarns which have been woven into a plain weave. It should be noted, however, that the present invention is not limited to such materials and constructions, and, as in the case of the fabric 2, any yarn having the requisite physical characteristics for use as a constituent of a forming medium may be used. For example, synthetic monofilaments may be used. In addition, other weave patterns, such as, for example, four-harness satin and leno weaves, may be used. Although not necessary, it has been found that by weaving a seam material 10, which is more permeable than fabric 2, marring or marking of the paper web at the laminated seam area during the papermaking process is substantially reduced, if not eliminated. In addition, it has been found that marring or marking of the paper web can be further reduced by using a seam material 10, the constituent yarns of which are smaller in diameter than the constituent yarns of the fabric 2.

Scrim material 8 is separate from and interposed between, thereby serving as an interface for, seam material 10 and fabric 2. Although not necessary, in the preferred embodiment the scrim material is woven into a plain weave using yarns which are not chemically inert, and which have high surface energies relative to the surface energy of the adhesive or bonding agent, thereby being readily wettable by the adhesive. By way of example only, such yarns include glass, cotton and metal. As described in detail hereinafter, preferably the yarns comprise low twisted multifilaments or staple fibers. In this manner the adhesive can be caused to penetrate the interstices of the yarns, thereby adding to the structural integrity or continuity of the composite laminate. However, the scrim material may also comprise monofilament or wire strands. Although not necessary, it is preferred that the diameter of the yarns which comprise the scrim material be very small relative to the constituent yarns of the fabric and seam material. In this manner, the thickness of the seam area is reduced, thereby reducing marring or marking of the paper web during the manufacture thereof, as noted above. For example, yarns having a diameter of about 40 percent of the diameter of the constituent yarns of the fabric have been found particularly suitable for use in the scrim material. While scrim material 8, as depicted in FIG. 1, comprises a plain weave, other types of weaves, for example, four-harness satin and twill weaves, may be utilized. In an optimum seam design the porosity of the seam area would be substantially the same as the porosity of the remaining portion of the fabric. Accordingly, in order to maximize the porosity in the seam area, it is desirable, although not necessary, to use a scrim material which has a greater degree of porosity than either the fabric or seam material. For example, it has been found that a scrim material which is 50 to 75 percent more porous than the fabric, contributes considerably to the maximization of seam area porosity. The composite structure is bonded, as, for example, by using an adhesive 12, such as an epoxy resin. As explained hereinafter in greater detail, the bond is perfected such that the constituent yarns of the fabric 2, scrim material 8, and seam material 10 are encapsulated with the adhesive 12; that is, the constituent yarns of the forming fabric are encapsulated with the adhesive which in turn encapsulates the constituent yarns of the scrim material and fabric, respectively. In this manner, a fluid permeable yet structurally integrated body is produced, as depicted in FIG. 2. For example, as depicted in FIG. 2, those portions 14 of the scrim material 8 which are not in contact or near contact with the seam material 10 or fabric 2 are still encapsulated with adhesive 12 such that the glue-line or adhesive layer 12 is continuous. In this manner, the forces exerted on the glue-line during, for example, the paper-making process, are evenly distributed throughout the seam area due to the structural integration of the adhesively bonded seam-scrim-fabric laminate. As noted above, desirably the diameter of the constituent yarns of the scrim material 8 is less than the diameter of the yarns which comprise the fabric 2. The relatively large yarns of the fabric 2 are required so that the forming fabric will be strong enough to withstand the forces exerted upon it during the papermaking operation. By using relatively smaller yarns in the scrim material 8, it is possible to encapsulate them substantially entirely in the adhesive 12 at those points where the scrim yarns come into contact or near contact with the fabric or seam material. The continuity of the glue-line can be further perfected by using a scrim material comprising multifilament yarns which may be impregnated with the adhesive 12. For example, untwisted multifilament yarns have been found to be particularly suitable for use in the present invention.

Although the direction in which the constituent yarns of the seam material, scrim material, and fabric extend relative to each other is not critical to the teachings of the present invention, preferably the yarns of the seam material and fabric are parallel relative to each other, the yarns of the scrim material being disposed 45° thereto.

Without wishing or intending to be bound by a theory of operation, it is believed that a porous laminated structure having superior strength, as disclosed herein, is achieved as a result of the intermediate scrim material being encapsulated with the bonding agent or adhesive, and the resultant composite structure being structurally integrated with both the seam material and the forming fabric as a result of the simultaneous encapsulation of the scrim material with the constituent yarns of the fabric and seam material. Put another way, the adhesive coating 12 on the scrim material 8 is continuous with, and, in fact, a part of the adhesive coating 12 on the fabric 2 and seam material 10 at points of contact or near contact between the scrim material 8 and fabric 2 and scrim material 8 and seam material 10. In this manner a physical or "mechanical" bond, as distinguished from an adhesive bond, is perfected; that is, a bond is perfected which is more dependent upon the physical relationship between the seam material, scrim material, adhesive, and fabric, than the adhesive characteristics of the constituent materials. As depicted in FIG. 2, those portions of the scrim material which are not in contact or near contact with the seam material or fabric are still encapsulated with adhesive 12 such that the glue-line or adhesive layer is continuous. In this manner, the bonding material substantially continuously encapsulates the constituent members of the fabric layers and scrim interface.

Figure 3:
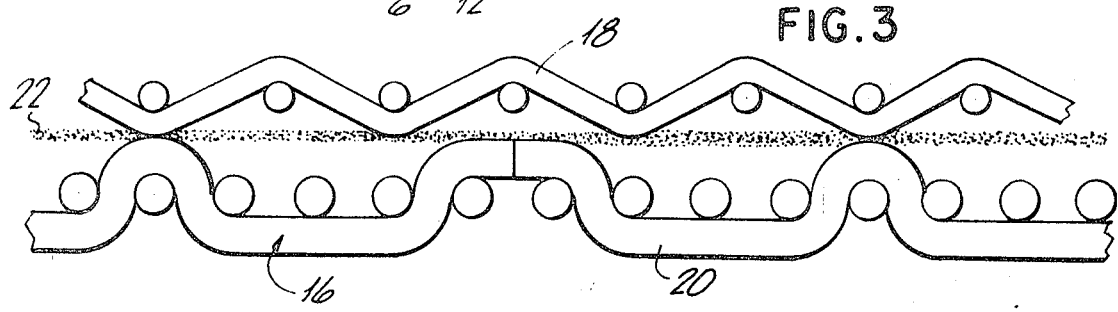
FIG. 3 is a schematic cross-sectional view of a fabric embodying the prior art.
Figure 4:
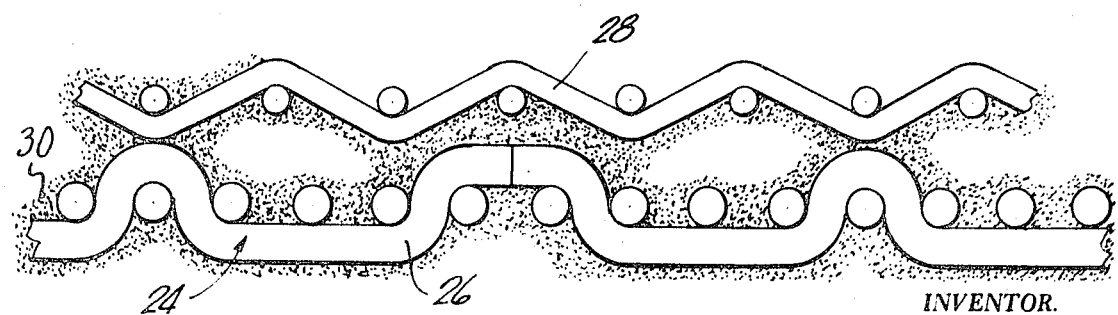
FIG. 4 is a schematic cross-sectional view of another fabric embodying the prior art.

The present invention is to be distinguished from the composite structure 16, depicted in FIG. 3, wherein adjacent layers 18 and 20 are affixed to one another as a result of surface adhesion, as distinguished from yarn encapsulation, perfected by means of an adhesive. Such a bond depends on the adhesive qualities of the bonding agent or adhesive 22 and the yarns which comprise the various layers of the laminate, and the degree of contact area between adhesive 22 and said yarns. The present invention is also to be distinguished from the composite structure 24 depicted in FIG. 4 wherein the layers 26, 28 are bonded together by means of an adhesive 30, which encapsulates the constituent yarns of adjacent layers. It should be noted that laminate 24 does not include the intermediate scrim material disclosed in the present invention.

Figure 5:
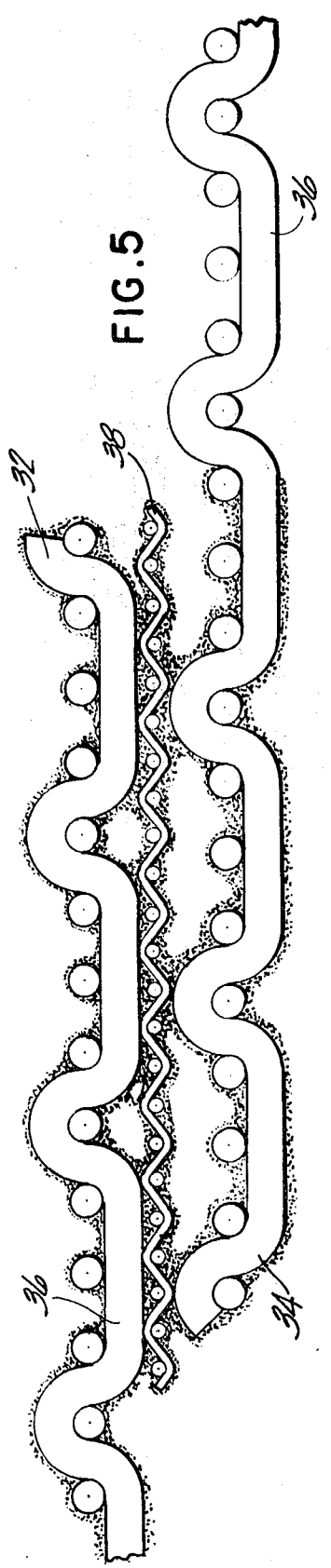
FIG. 5 is a schematic cross-sectional view of another fabric embodying the teachings of the present invention.

The present invention is not limited to the embodiment depicted in FIG. 1, however. For example, as depicted in FIG. 5, a seam may be perfected wherein the seam material described above is actually part of the fabric. By overlapping both ends 32, 34 of fabric 36 interposing therebetween scrim material 38, and adhesively bonding the composite laminate as described herein, a porous seam structure which is continuously integrated is perfected wherein one end 32 of the fabric 36 takes the place of the seam material. Alternatively, prior to joining fabric 36, a strip of scrim material 38 may be adhesively bonded to opposite sides of fabric 36 at both ends thereof. Subsequently, portions of the adhesive may be removed from the surface of the scrim material which is not adhered to fabric 36. Finally, the scrim material attached to one end of the fabric may be positioned in face-to-face contact with the scrim material attached to the other end of the fabric and the composite fabric-scrim-scrim-fabric laminate adhesively bonded.

Figure 6:
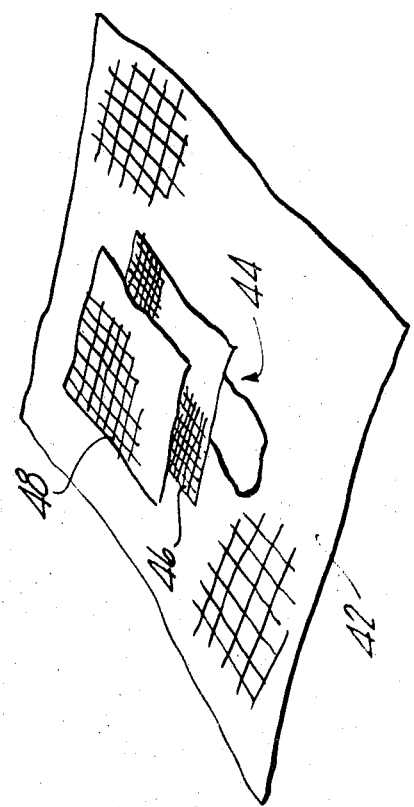
FIG. 6 is a diagrammatic view of a fabric patch embodying the teachings of the present invention.

In accordance with one embodiment of this invention, illustrated in FIG. 6, a portion of a forming fabric 42 which has been patched is depicted. As in the case of the fabric seam discussed above, the patched area 44 of fabric 42 comprises a scrim material 46 interposed between an outer layer or patch material 48 and fabric 42, the composite structure being bonded as described herein. In this manner, a patched area is perfected which is porous yet structurally integrated with the forming fabric, the bond being substantially as strong as, if not stronger than, the constituent materials which comprise the fabric 42. In addition, by perfecting the bond in accordance with the method described hereinafter, the physical characteristics of the patched area of the fabric are substantially the same as the physical characteristics of the fabric as a whole.

Figure 7:
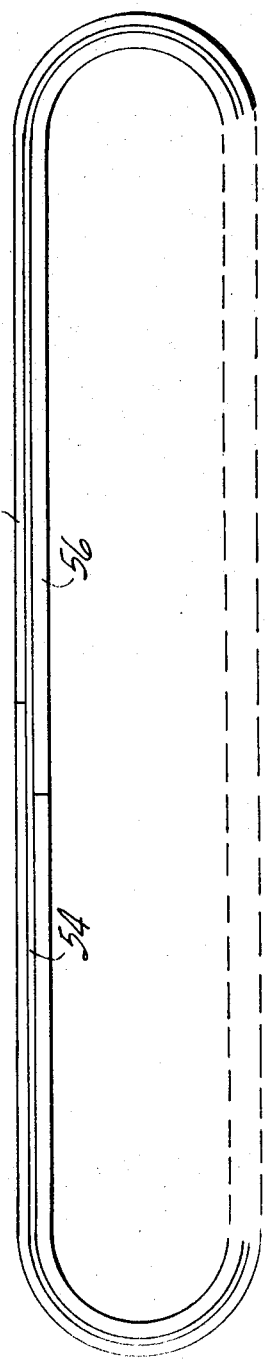
FIG. 7 is a schematic cross-sectional view of a duplex fabric embodying the teachings of the present invention.

FIG. 7 illustrates a further application of the teachings of the present invention, depicting a duplex or multilayered forming fabric. The fabric 52 comprises a scrim material 54 interposed between a base layer 56 and paper contacting or outer layer 58. The composite structure is bonded, as, for example, by using an adhesive such as an epoxy resin. As in the case of the fabric seam and patch, duplex fabric 52 is a structurally integrated whole, having the physical characteristics required of forming fabrics, as set forth above.

The process of joining two layers of fabric to each other at their flat surfaces comprises the steps of interposing between the layers at least one separate layer of foraminous material, and substantially continuously encapsulating the constituent members of such fabric and interposed layer(s) with a material throughout at least a portion of the region where the layers are superimposed with respect to each other. Although not necessary, in order to maximize the porosity of the composite structure, any excess adhesive which may exist in the interstices of the structure may be removed. In addition, in some cases it may be desirable to cure the encapsulating material. For example, when the laminate is produced by interposing between two layers of fabric a separate scrim material, and substantially continuously encapsulating the constituent members of such fabric and scrim material with an adhesive such as an epoxy resin, it may be desirable to cure the epoxy resin by, for example, subjecting the laminate to heat and/or pressure. The encapsulating material may be added before or after the layers have been positioned relative to each other.

In order to obtain a greater bonding area, that is, more surface contact between one fabric layer and scrim material, and between the other fabric layer and scrim material, the surfaces of the fabric layers which will be adjacent to the scrim material when the laminate has been perfected, may be rendered planar, as, for example, by sanding same. The bond may be further strengthened by thoroughly drying the fabric layers in the area to be laminated, thereby reducing any tendency for the adhesive to become degraded by moisture. A more porous laminate may be perfected if, after the encapsulating material or bonding agent is applied to the inner fabric layer, and before the outer fabric layer and scrim material are subjected to the adhesive and positioned on the inner layer, any excess adhesive is removed from the interstices of the inner layer as by blowing air under pressure through the fabric. In addition, after the outer layer and scrim material have been encapsulated with the bonding agent, and positioned on the inner layer, any additional bonding agent which exists in the interstices of the composite structure may be similarly removed.

When, for example, the encapsulating material or bonding agent is cured by subjecting it to heat, care must be taken that the temperature not be greater than the melting point of the constituent material comprising the fabric layers and scrim material. For example, in those cases where the fabric and seam material comprise polyester monofilament yarns, an adhesive having a curing temperature less than 300° F. should be used. An amine cured epoxy resin would be suitable in such applications. In this connection, it should be noted that although not necessary, epoxy-based adhesives are particularly suited for the present invention since their adhesive properties are not lost in those cases where the particular application requires that the base epoxy be modified with such additives as flexibilizers, filters, diluents, viscosity control agents, cure accelerators, high temperature stabilizers, and the like. Other examples of suitable encapsulating materials include, but are not limited to, phenolics, unsaturated polyesters, and rubber based adhesives. The encapsulating material may be in any form. For example, it may comprise a scrim material which, when subjected to heat, melts and encapsulates the various yarns of the resultant laminate.

EXAMPLE 1

Two pieces of fabric were joined by adhesively bonding one piece to the other, as set forth herein. Each fabric comprised 8 mil monofilament polyester yarns woven into a four-harness satin weave wherein there were 83 picks per inch and 48 ends per inch. One end of one fabric was brought into contact with one end of the other fabric across the full width thereof. The abutting ends were joined by positioning an outer layer or seam material in face-to-face engagement with both fabrics such that the seam material extended onto each fabric across the full width thereof about one inch, the yarns of the seam material being substantially parallel to the yarns of the joined fabric. The outer layer or seam material comprised three ply multifilament polyamide warp yarns and three ply multifilament polyester weft yarns woven into a four-harness satin weave wherein there were 71 picks per inch and 48 ends per inch. Prior to assembling the laminate, the seam material was treated with resin and heat set for stabilization; the surface of the seam material to be positioned in face-to-face engagement with the abutting ends of fabric being sanded to increase the surface roughness. An epoxy resin with an amine hardener was applied to the seam area and the composite structure cured at 250° F. for 15 minutes at about one pound per square inch pressure. The joined fabric was subjected to tensile forces. At about 106 pounds per lineal inch of width, the seam failed, the failure occurring at the adhesive-fabric interface or glue-line.

EXAMPLE 2

A second fabric was joined as set forth in Example 1, except that in this case, a scrim material was interposed between the abutting fabrics and the outer layer or seam material in accordance with the teachings of the present invention such that the yarns which comprise the scrim material were disposed 45° relative to the yarns which comprise the fabric and seam material. The scrim material comprised multifilament glass yarns having zero twist woven into a plain weave wherein there were 20 ends per inch and 20 picks per inch. The scrim material was about three mils thick. As in Example 1, the joined fabric was subjected to tensile forces. At about 210 pounds per lineal inch of width, the seam failed. Not only was the laminated seam produced in accordance with the teachings of the present invention about 100 percent stronger than the seam described in Example 1, but, in addition, the continuous or structurally integrated glue-line was stronger than the constituent yarns of the outer layer seam material, since the failure did not occur at the glue-line. Rather, at 210 pounds per lineal inch of width, the yarns which comprised the seam material broke.

EXAMPLE 3

A third fabric was joined as set forth in Example 1, except that the fabric comprised three-ply multifilament polyamide warp yarns and three-ply multifilament polyester weft yarns woven into a four-harness satin weave wherein there were 41 picks per inch and 30 ends per inch. In addition, prior to assembling the laminate, the fabric was treated with resin and heat set for stabilization, the portion of the surface of the fabric to be positioned in face-to-face engagement with the seam material being sanded to increase the surface roughness. This fabric could not be subjected to tensile forces because the seamed area fell apart when the fabric was picked up, thereby indicating that the seam had about zero tensile strength.

EXAMPLE 4

A fourth fabric was joined as set forth in Example 3, except that a scrim material was interposed between the seam material and fabric as described in Example 2. The joined fabric was subjected to tensile forces. At about 93 pounds per lineal inch of width the seam failed, the failure occurring at the adhesive-fabric interface or glue-line. Accordingly, the laminated seam produced in accordance with the teachings of the present invention was about 93 percent stronger than the seam described in Example 3.

EXAMPLE 5

A torn fabric comprising 8 mil monofilament polyester yarns woven into a four-harness satin weave having 83 picks per inch and 48 ends per inch was repaired by positioning a fabric patch over the torn area and adhesively bonding the composite structure as set forth in Example 1. The porosity of the fabric was 20.3 gallons per minute per foot squared ($gpm/ft^2$). The patch material was woven into a plain weave, using yarns which comprise multi-filament polyester and polyamide fibers, wherein there were 50 picks per inch and 50 ends per inch. The patch material was treated with resin and heat set for stabilization, the surface of the patch material to be positioned in face-to-face engagement with the fabric being sanded to increase the surface roughness. The peel strength of the patch was measured at 1.2 pounds. The porosity of the patched area was reduced by about 25 percent to 15 $gpm/ft^2$.

EXAMPLE 6

A second patch was applied to the fabric described in Example 5 in the same manner as set forth therein, except that a scrim material was interposed between the fabric and the patch material. The peel strength of the patch was measured at 3 pounds. Although the peel strength of the laminated patch produced in accordance with the present invention was more than 100 percent greater than the patch described in Example 5, there was only a 20 percent reduction in porosity.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A means for joining two layers of woven fabric to each other at their flat surfaces comprising at least one foraminous layer interposed between and separate from both of said layers of fabric, and a composition which substantially continuously encapsulates the constituent members of said fabric layers and said interposed layer substantially continuously throughout at least a portion of the region where they are superimposed with respect to each other.

2. The article described in claim 1 wherein the free surface energy of said composition is less than the free surface energy of said foraminous layer.

3. The article described in claim 2 wherein said foraminous layer is a glass scrim.

4. The article described in claim 3 wherein said glass scrim comprises multifilament yarns.

5. The article described in claim 4 wherein said glass scrim is woven.

6. The article described in claim 5 wherein said glass scrim is woven into a plain weave.

7. The article described in claim 6 wherein said glass scrim is woven from multifilament yarns.

8. The article described in claim 2 wherein said composition is an epoxy resin.

9. The article described in claim 8 wherein said foraminous layer is a glass scrim.

10. The article described in claim 2 wherein at least one of said two layers is woven from synthetic yarns.

11. The article described in claim 10 wherein said yarns are synthetic polyesters.

12. A porous laminate comprising a first layer interposed between a second and third layer, said first layer being woven into a plain weave from multifilament glass yarns, said second and third layers being woven from synthetic polyester yarns, said yarns of said second and third layers being disposed substantially parallel to each other and at about 45° to said yarns of said first layer, said layers being adhesively bonded together with an epoxy resin such that said resin substantially encapsulates the constituent members of all of said layers substantially continuously throughout at least a portion of the region where they are superimposed with respect to each other.

13. A method of joining two layers of fabric to each other at their flat surfaces comprising the steps of interposing between said layers at least one separate layer of foraminous material, and substantially continuously encapsulating the constituent members of said fabric and said interposed layers with a composition throughout at least a portion of the region where said layers are superimposed with respect to each other, by applying a bonding agent to all of said layers, removing any excess bonding agent from the interstices of said layers, and curing said bonding agent.

14. A method according to claim 13 in which said curing involves subjecting said bonding agent to heat and pressure.

* * * * *